United States Patent
Doppler et al.

(10) Patent No.: US 9,510,322 B2
(45) Date of Patent: Nov. 29, 2016

(54) D2D COMMUNICATION PROCEDURES: BEACONING; BROADCAST; CONFLICT RESOLUTION

(75) Inventors: Klaus Franz Doppler, Berkeley, CA (US); Jarkko Lauri Sakari Kneckt, Espoo (FI); Mika P. Rinne, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 197 days.

(21) Appl. No.: 13/817,212

(22) PCT Filed: Sep. 14, 2010

(86) PCT No.: PCT/IB2010/002293
§ 371 (c)(1),
(2), (4) Date: Feb. 15, 2013

(87) PCT Pub. No.: WO2012/035367
PCT Pub. Date: Mar. 22, 2012

(65) Prior Publication Data
US 2013/0148566 A1 Jun. 13, 2013

(51) Int. Cl.
*H04W 72/00* (2009.01)
*H04W 74/08* (2009.01)
(Continued)

(52) U.S. Cl.
CPC ......... *H04W 72/005* (2013.01); *H04W 76/002* (2013.01); *H04W 74/0841* (2013.01); *H04W 84/18* (2013.01); *H04W 88/04* (2013.01)

(58) Field of Classification Search
CPC . H04L 1/1812; H04L 1/1822; H04L 1/1825; H04L 1/1864; H04L 1/1887; H04L 1/1896; H04W 72/044; H04W 76/002
USPC .......................... 370/245–350; 709/201–213
See application file for complete search history.

(56) References Cited

U.S. PATENT DOCUMENTS 8,243,701 B2 * 8/2012 Palm et al. ............... 370/338
8,432,887 B1 * 4/2013 Ding .......................... 370/348
(Continued)

FOREIGN PATENT DOCUMENTS

CN        1889750 A    1/2007
CN    101772137 A    7/2010
(Continued)

OTHER PUBLICATIONS

Chinese Office Action dated Mar. 26, 2015, for corresponding Chinese Patent Appln. No. 201080069112.2.
(Continued)

*Primary Examiner* — Ayaz Sheikh
*Assistant Examiner* — Debebe Asefa
(74) *Attorney, Agent, or Firm* — Squire Patton Boggs (US) LLP

(57) ABSTRACT

There is a method and apparatus for transmitting a beacon for D2D communications in a first radio resource selected from among a first set of radio resources of a beacon frame; and for transmitting a broadcast message in a second radio resource selected from among a second set of radio resources of the same beacon frame. In various particular embodiments: the beacon has an indication that the broadcast message is to be transmitted in the beacon frame; the beacon has an indication specifying the second radio resource; there is transmitted a broadcast message header in the second radio resource during an initial subframe of the beacon frame and the broadcast message header has an indication of how many subframes are allocated for the broadcast message; and the broadcast message header has a retransmission control field that selectively indicates which broadcast partners are to re-transmit the broadcast message.

17 Claims, 11 Drawing Sheets

(51) Int. Cl.
*H04W 76/00* (2009.01)
*H04W 84/18* (2009.01)
*H04W 88/04* (2009.01)

(56) References Cited

U.S. PATENT DOCUMENTS

| | | | |
|---|---|---|---|
| 8,787,266 B2* | 7/2014 | Matischek et al. | 370/329 |
| 8,983,365 B2* | 3/2015 | Capparelli et al. | 455/3.06 |
| 8,983,468 B2* | 3/2015 | Laroia et al. | 455/436 |
| 2004/0082294 A1* | 4/2004 | Ekl et al. | 455/3.05 |
| 2007/0171910 A1* | 7/2007 | Kumar | 370/392 |
| 2008/0019344 A1 | 1/2008 | Palm et al. | |
| 2008/0181173 A1* | 7/2008 | Wei | 370/329 |
| 2010/0010899 A1 | 1/2010 | Lambert et al. | |
| 2010/0165864 A1 | 7/2010 | Yamaguchi et al. | |
| 2010/0265864 A1* | 10/2010 | He et al. | 370/311 |
| 2010/0311436 A1* | 12/2010 | Bevan et al. | 455/456.1 |

FOREIGN PATENT DOCUMENTS

| | | |
|---|---|---|
| WO | WO 2004/038938 A1 | 5/2004 |
| WO | 2008/010007 A1 | 1/2008 |
| WO | WO2009/072761 A2 | 6/2009 |

OTHER PUBLICATIONS

State Intellectual Property Office of the People's Republic of China, Office Action for corresponding Chinese Patent Appln. No. 201080069112.2, Nov. 2, 2015.
International Search Report dated May 12, 2011 corresponding to International Patent Application No. PCT/IB2010/002293.

* cited by examiner

| IE name in BCH | Broadcast Message Sent | Broadcast resources (optional) |
|---|---|---|
| Information Present: | 1 (Sending Broadcast Msg) 0 (No Broadcast Msg) | Broadcast resource selected for broadcast message |
| # of Bits: | 1 | 5 |

Figure 3A

| IE name in header | Subframes Allocated for Broadcast (302) | Retransmission bit (304) | Recipient | Message type | Retransmission Control Bit field (306) | Reservation for future BO |
|---|---|---|---|---|---|---|
| Information Present: | 1 – 8 | 0 (source device); 1 (retransmitting device) | Possibility to send messages to multicast group (1..15); broadcast (0) | Possibility to introduce different message types | (see Figure 3C) | 1-8; 0 (only this BO) |
| # of Bits: | 3 | 1 | 4 | 4 | 8 | 3 |

Figure 3B

| Retransmission Control Bit field (306) | | | | |
|---|---|---|---|---|
| Bit 0 | Bit 1 | ... | Bit 7 | Add'l bits (8-9) |
| 1 (all receivers retransmit), 0 (only broadcast partners retransmit) | 1 ( Broadcast partner #0 retransmits) 0 ( Broadcast partner #0 does not retransmit) | ... | 1 ( Broadcast partner #7 retransmits) 0 ( Broadcast partner #7 does not retransmit) | # of retransmission hops remaining |

Figure 3C

| | 902 Broadcast Messages Timeout | 904 Max Amount of Failed Consecutive messages | 906 Max Average of the Failed messages |
|---|---|---|---|
| Values | 0-63 | 0-15 | 0-63 |
| Bits | 6 | 4 | 6 |

Figure 9A

| | 910 Message Type | 912 Bitfield of BOs of Received Broadcast Messages | 914 Bitfield of Received Broadcast Subslots Reception Success | 916 BOs since the Previous Successful Reception |
|---|---|---|---|---|
| Values | Broacast Status Indication | Bitfield, [0|1]^64 | Bitfield, [0|1]^64 | 0-255 |
| Bits: | 8 | 64 | 64 | 8 |

Figure 9B

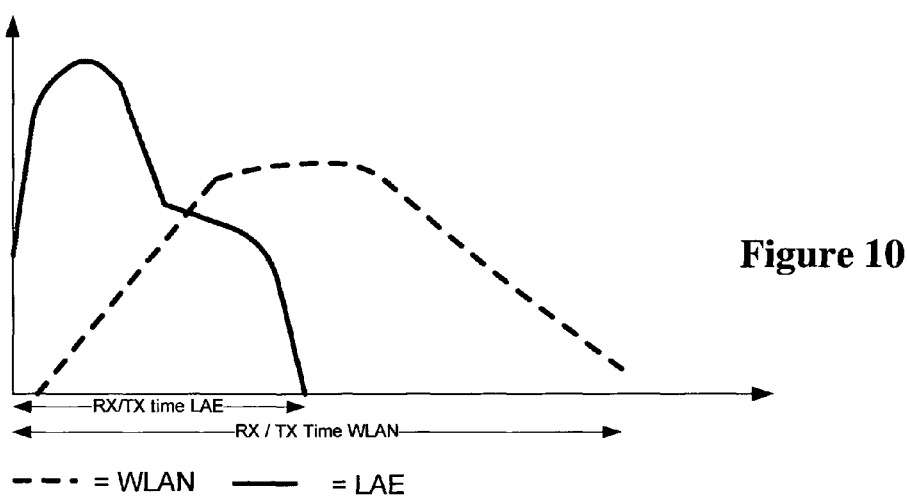

Figure 10

- - - = WLAN  ——— = LAE

|               | 1302                                                        | 1303                                                                                      |
| ------------- | ----------------------------------------------------------- | ----------------------------------------------------------------------------------------- |
| Message Type  | Device with highest priority (see 3) for priority determination | Unused resources                                                                      |
| Conflict Indication | Beacon channel ID and physical device ID              | Bitmap, Each bit set to 1 indicates used resources and bit set to 0 indicates unused resources |
| Bits:         | 5 and 4                                                     | 25                                                                                        |
Figure 13
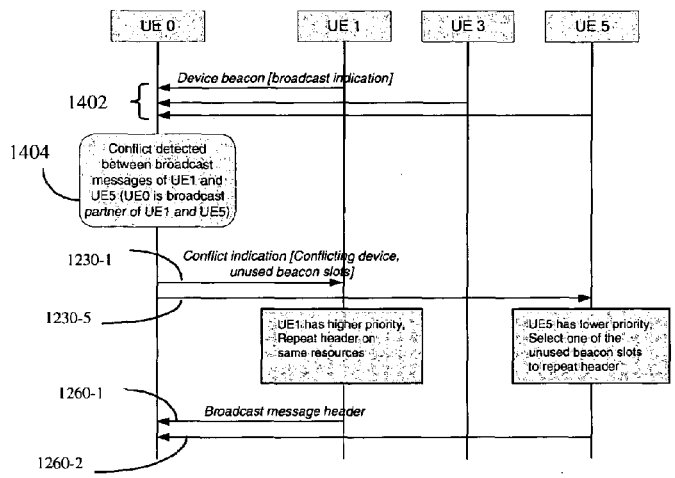
Figure 14
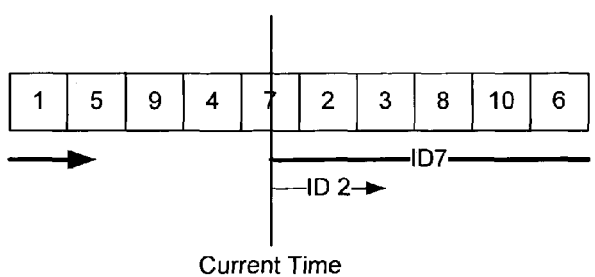
Figure 15

D2D COMMUNICATION PROCEDURES: BEACONING; BROADCAST; CONFLICT RESOLUTION

TECHNICAL FIELD

The teachings herein relate generally to device transmissions of device beacons and broadcast messages by devices engaging in wireless device-to-device D2D communications.

BACKGROUND

The following abbreviations and terms are herewith defined:
AP access point
Beacon receiver device receiving during the first DL period
Beacon transmitter device transmitting during the first DL period
BCH broadcast channel
BO beacon opportunity
BS base station (e.g., any generic network access node)
D2D device-to-device
DL downlink
eNB base station in an LTE/LTE-A system
E-UTRAN evolved UTRAN
LAE local area evolution (working name of a local radio access network including device-to-device communication)
LTE long term evolution of UTRAN (also known as 3.9 G)
LTE-A LTE advanced
OFDMA orthogonal frequency division multiple access
PBCH primary broadcast or beacon channel
PRS pseudo-random sequence
PSS primary synchronization sequence
RACH random access channel
RRM radio resource management
SRS sounding reference signal
SSS secondary synchronization sequence
UE user equipment (e.g., mobile or subscriber station SS/MS, terminal)
UL uplink
UMTS universal mobile telecommunications system
UTRAN UMTS terrestrial radio access network
WiMAX worldwide interoperability for microwave access
WLAN wireless local area network Future wireless communication systems are trending towards integrating network topologies rather than having multiple networks using different protocols overlying one another in the same geographic space. For example, there is some research into heterogeneous networks that are a deployment of macro, micro, pico, and/or femto cells and using relay nodes in the same LTE/LTE-A cellular overlay topology to all exploit the same radio spectrum. Another area of research in this integration concept is to allow direct communication between user devices when they are close to one another. This is often referred to as device-to-device D2D communications. At least the early conceptions of D2D communications use licensed radio spectrum that is specifically allocated by the cellular or other hierarchical network. One likely implementation for D2D is within a 'home' cell. Proposals for D2D variously are within WiMAX, HiperLAN 2, and Tetra protocols, to name a few non-limiting examples. For spectrum usage, it is also feasible that said heterogeneous networks or said D2D communications do not all utilize the same radio spectrum, but they share and divide among communication needs all the available radio spectrum in an efficient and reasonable manner, as allowed by regulations and licensing. In this kind of local use of radio spectrum, novel cognitive radio technology plays a significant role.

There is a need to establish D2D operation for data exchange between the devices in the coverage range. Prior art approaches often rely on the D2D devices being first authenticated to one another before broadcast messages can actually be exchanged between them. This leads to a large time delay from the initial state, when a message is ready to be sent to the time at which the other device is authenticated and a communication link between them is available for the transfer of user data.

Currently, D2D beacon opportunities are described only to exchange D2D and ad hoc network beacon messages and initiate handshaking for unicast message exchange for discovery, authentication and association messages. A broadcasting service is needed to enable new options for users and network operators, including location based marketing, creating local communities, local discussions and micro-blogging, pervasive games, and even local searches using a "local semantic web".

One reference which may be relevant to these teachings is Danish patent application 2008E02868 DK, in which BSs are split into groups and continue sending the same message until all other BSs have potentially received the message. This method is designed for a case where each BS has information to send and every BS should receive the information of every BS.

Also relevant to these teachings is WO 09/018212, in which route discovery packets are flooded in the network. A broadcast buddy acknowledges the received broadcast message and ensures that at least one other device has received the message. U.S. Pat. No. 7,639,709 teaches that in a bootstrap period devices can make reservations for the usage of broadcast time slots.

SUMMARY

In a first aspect the exemplary embodiments of the invention provide a method comprising: in a beacon frame, transmitting a beacon for device to device communications in a first radio resource selected from among a first set of radio resources of the beacon frame; and in the beacon frame transmitting a broadcast message in a second radio resource selected from among a second set of radio resources of the beacon frame.

In a second aspect the exemplary embodiments of the invention provide a computer readable storage medium or memory storing a program of computer readable program of instructions that when executed by at least, one processor result in actions comprising: transmitting a beacon for device to device communications in a first radio resource selected from among a first set of radio resources of a beacon frame; and transmitting a broadcast message in a second radio resource selected from among a second set of radio resources of said beacon frame.

In a third aspect the exemplary embodiments of the invention provide an apparatus comprising at least one processor and at least one memory storing a computer readable program of instructions. In this third aspect the at least one memory with the program of instructions is configured, with the at least one processor, to cause the apparatus to perform at least: transmitting a beacon for device to device communications in a first radio resource selected from among a first set of radio resources of a beacon frame; and transmitting a broadcast message in a second radio resource selected from among a second set of radio resources of said beacon frame.

In a fourth aspect the exemplary embodiments of the invention provide an apparatus comprising: means for transmitting a beacon for device to device communications in a first radio resource selected from among a first set of radio resources of a beacon frame; and means for transmitting a broadcast message in a second radio resource selected from among a second set of radio resources of said beacon frame. In a particular embodiment these means comprise at least one transmitter in combination with at least one processor.

These and other more particular aspects are detailed below with particularity.

BRIEF DESCRIPTION OF THE DRAWINGS

The foregoing and other aspects of these teachings are made more evident in the following Detailed Description, when read in conjunction with the attached Drawing Figures.

FIG. 3A illustrates an exemplary bit for transmission in the device beacon to indicate if the device also has a broadcast message to send in the same OFDMA symbol and the same beacon frame.

FIG. 3B illustrates bit fields in a header of an individual broadcast message and associated meanings according to an exemplary embodiment of the invention.

FIG. 3C illustrates meanings for bit values in different bit positions of the "Retransmission Control Bit" field of FIG. 3B according to an exemplary embodiment of the invention.

FIG. 9A is a table of information elements to specify criteria in broadcast partner setup signaling for broadcast message quality measurement according to an exemplary embodiment of the invention.

FIG. 9B is a table of information elements of the broadcast status indication message of FIG. 8 containing statistics of the broadcast message transmissions, according to an exemplary embodiment of the invention.

FIG. 10 is a graph comparing the estimated power density (vertical axis) and minimum radio on times (horizontal axis) for LAE and WLAN radios to transmit broadcast messages.

FIG. 13 is a table of information elements of the conflict notification message sent by receiving devices to devices having a broadcast message conflict according to an exemplary embodiment of the invention.

FIG. 14 is a signaling diagram in a collision detection environment in which the beaconing device UE1 with the lower priority select an unused broadcast resource to re-transmit its header and to transmit its broadcast messages according to an exemplary embodiment of the invention.

FIG. 15 is a conceptual diagram showing device priority based on device ID and timestamp according to an exemplary embodiment of the invention.

DETAILED DESCRIPTION

Figure 7:
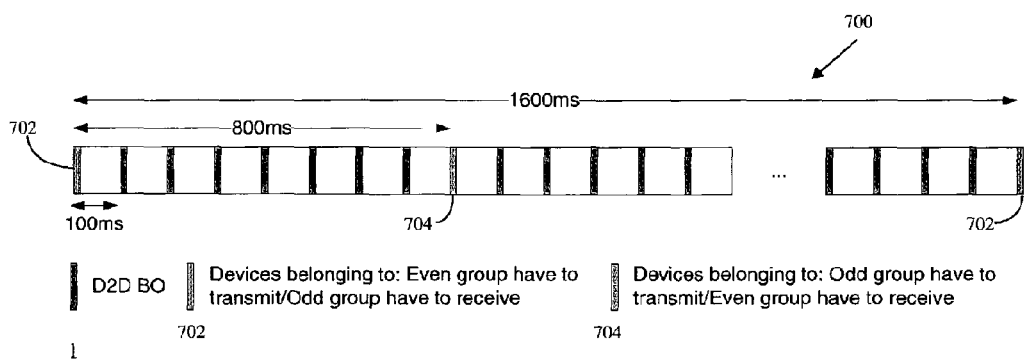
FIG. 7 is a timeline showing exemplary beacon opportunities for broadcast message transmission, according to an exemplary embodiment of the invention.

One particular but non-limiting environment in which embodiments of the present invention may be practiced is a system in which messages are flooded among all participants over multiple hops to created improved always available message distribution channel. As one example, the Nokia's Instant Community is enabling devices to share content with the devices in proximity. The Instant Community may be arranged by having a D2D network in which there is a periodic repeating radio frame (e.g., every 100 ms) which is reserved for D2D beaconing. FIG. 7 illustrates an example of such beaconing frames. If there is an AP present, this reserved radio frame for D2D beacons (each being a beacon opportunity) is a given offset from the periodic AP beacons which occur much more frequently (e.g., 10 ms). The AP's periodic beacons are not specifically shown at FIG. 7. While this beacon opportunity is reserved in time, beacon transmissions are concentrated in the frequency domain within that reserved radio frame (e.g., within a 50 MHz slice of an overall 200 MHz band). This D2D beaconing slice of the spectrum is divided into beaconing channels e.g., 25 channels of 2 MHz each. Another practical exemplary parametrisation is 20 MHz slice having 16 beaconing channels each of size 6*180 KHz. Each participating D2D device transmits its own beacon in one channel of the slice and can acquire knowledge on other participating D2D devices by listening to the remainder of the slice while not transmitting itself, thereby saving battery power by avoiding the need to coordinate irregular wake-up periods. Any individual D2D device can transmit, receive or doze/sleep during a particular beaconing opportunity, but cannot doze indefinitely due to a maximum time (e.g., 1600 ms) stipulated between any individual device's D2D beacon transmissions. The content of such D2D beacons can be for example a primary synchronization sequence PSS, followed by a secondary synchronization sequence SSS, followed by a primary beacon channel PBCH. The PSS and SSS form part of the layer 1 device identification ID, which is used to separate reference symbols and the content of the PBCH among neighboring devices. Of course, in other exemplary environments the channels may employ a time division or a code division rather than a frequency division.

A handshake authentication between D2D devices is described. After a device transmits its own D2D beacon in a DL subframe, it immediately makes itself available for the reception of a random access request by other devices on that UL subframe, which is indicated as the beaconing device's random access channel (RACH). Devices, which do not want to communicate further with the devices will indicate this in the RACH of the beaconing device e.g. by refraining their own beacon transmission or by indicating in their own beacon transmission that they are not available for a RACH request. The combined DL beacon and UL RACH spans for example 1.5-3.0 ms, and the actual handshake procedure takes place after the combined beacon/RACH time span. By example, the handshake procedure includes a service discovery request and response (if the involved D2D devices have not yet performed this with one another), an authentication and association exchange (also if they have not yet performed this with one another), and an indication if there is any data to exchange, and the data exchange, if any. The handshake procedure may also include negotiation of resources to be used for later communication, or simply session initiation. The authentication and association may be needed to ensure the correct recipient or the source of the data, and to negotiate the suitable resource for the data exchange.

Figure 1:
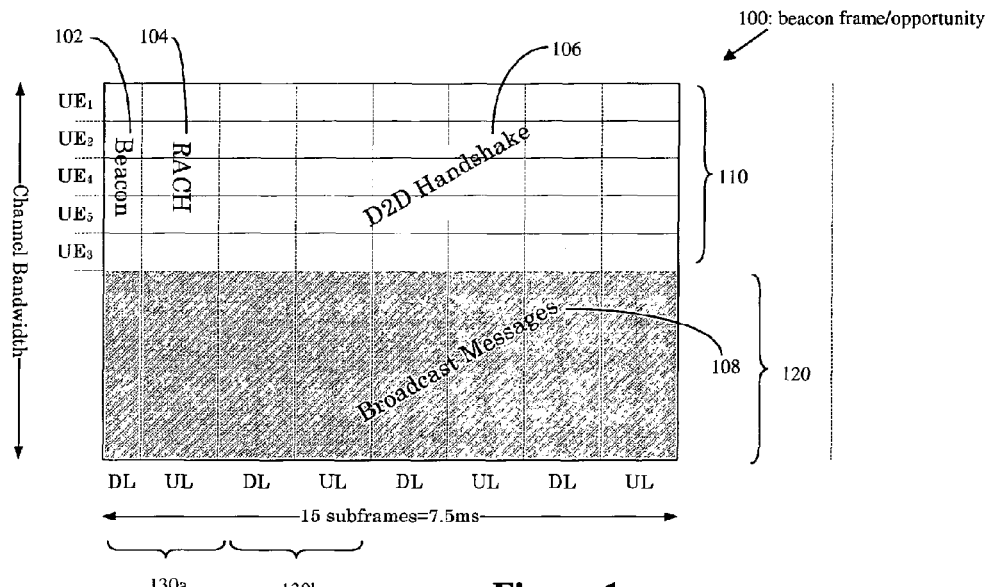
FIG. 1 illustrates a D2D beacon frame structure during a beaconing opportunity according to an exemplary embodiment of the invention in which resources which are not used for device beacons are used for D2D device broadcast message transmissions.

FIG. 1 illustrates a D2D beacon frame structure according to an exemplary embodiment of this invention. The shaded areas illustrate radio resources that are available for broadcast messages from the D2D devices. The unshaded areas are set aside for the beaconing 102, RACH 104, and the handshake procedure 106 detailed above for the example Nokia Instant Community environment. The entirety of FIG. 1 is constrained to one beaconing opportunity, which at FIG. 1 by example is eight DL/UL time periods/subframes spanning a total of 7.5 ms which is the length of the periodic beaconing opportunity. This frame structure can enable 250 D2D devices to join the beaconing group which reserves for example a 50 MHz band, assuming a maximum time between a device's beacon transmissions is ten beacon opportunities.

Consider an example. If in a given beacon opportunity only half the participating D2D devices transmit their beacons and the other half only listen, the 25 beaconing channels can enable 50 total devices. Extending this so that each device only transmits once per the maximum interval enables many higher multiples of the 25 beaconing channels, depending on how long is that maximum interval between a device's beacon transmissions. Lengthening the maximum interval and/or using more than 25 beaconing channels per beaconing opportunity enables even more than 250 participating devices. There is expected to be far fewer than 250 D2D devices in a typical ad hoc/D2D network as they are widely adopted, and so these teachings are satisfactory even for extreme D2D networking implementations.

Services such as the Nokia Instant Community concept could use OFDMA principles. For D2D applications that means the beaconing itself uses framed transmissions in the time domain as detailed above, and there is also multi-user signal multiplexing in the frequency domain across the OFDMA sub-channels. With reference to FIG. 1 then, a D2D device transmits its broadcast messages in the same OFDMA symbols as are used for the device's beacon and handshake procedure, and as seen at FIG. 1 those broadcast messages follow the same UL/DL frame structure as the beacon frame. Said another way, within a beacon opportunity 100 there is a first set of radio resources 110 (those for beaconing 102 and RACH 104 at FIG. 1) for establishing and maintaining the D2D or ad hoc network and for management and data exchange (the handshake 106 at FIG. 1); and there is a second set of radio resources 120 (the broadcast messages 108 at FIG. 1) which are the remaining resources of the beaconing opportunity for the D2D devices to send broadcast messages to all devices within a local coverage area in a minimum time (the beaconing opportunity), and the first and second sets of radio resources use parallel OFDMA resources in the frequency domain. In other implementations the parallel resources can be in the time or code domain. So there is a flexible part of OFDMA resources within a channel dedicated to device beacon transmissions and the remaining part of the resources dedicated to sending broadcast messages initiated by devices participating in the beaconing. The first and second sets of radio resources are not necessarily fixed in the number or in the specific resources that are in a given set, but in an embodiment the radio resource sets are flexible to adapt to different numbers of devices using D2D communications.

This enables the operation of one-to-many D2D broadcasts on top of the OFDMA beaconing scheme. One technical effect of this general concept is that D2D devices are able to receive beacons and broadcast messages in the same frame, and the on-time for the device's receiver and thus power consumption is not increased by waking up a second time at a later time to receive broadcast messages. There is some additional energy consumption related to the handling of broadcast messages, but it is small because there is no additional media listening time to receive the broadcasts and there is no separate wake-up from sleep mode of any internal electronics of the device. Assuming turbo decoding, it is estimated that by the year 2015 the analog components of a receiver will consume 90% of the energy during reception, compared to about 50% today, meaning the marginal advantage of these teachings concerning power savings will be more pronounced in the future as analog components becomes the more predominant power draw since avoiding a wake from sleep mode avoids cycling analog components.

The broadcast messages are transmitted to be available among all devices in the coverage area. The broadcast messages may contain a wide variety of different content. By non-limiting example, the broadcast messages may advertise availability of the local application, service or a device (machine); they may be used for general advertisements of the shops or restaurants, they may setup a multi-hop routing table, or simply be a friendly message to everyone close to device. The broadcast messages may be flooded over multiple hops of nodes or they may be transmitted over a single hop only.

Figure 6:
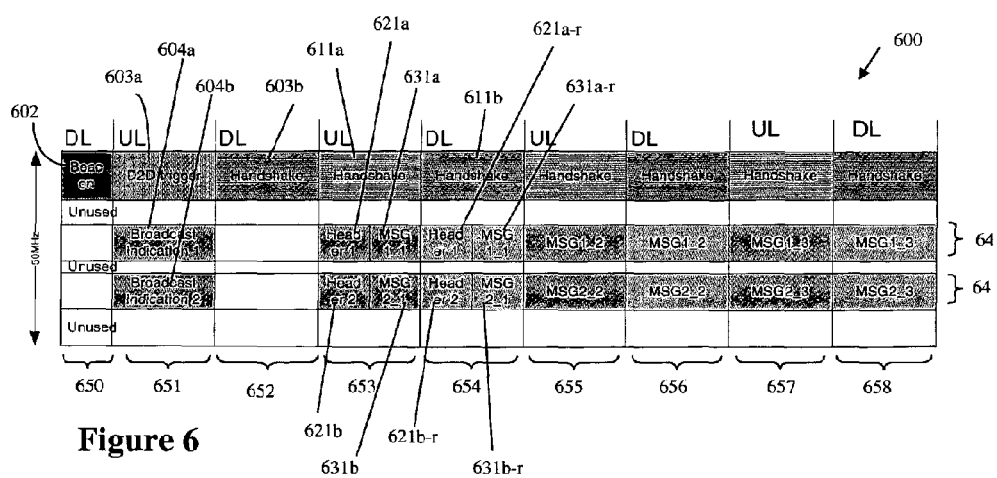
FIG. 6 is similar to FIG. 2 but showing more detail and for the case in which the partner devices initiate broadcast messages in the frame in which they do not send a beacon, according to an exemplary embodiment of the invention.

As can be seen at FIG. 1, the radio resources during a beacon frame 100 are split into a sequence of transmission periods 130a, 130b in which the D2D devices may transmit or receive, i.e. the periods are kind of consecutive set of five to eight DL/UL periods 130a, 130b. This resource split is targeted to enable signaling possibilities within the first set of radio resources 110 to initiate authentication, association and data exchange resource allocation to the (ad hoc) network, or stated more generally to initiate or execute all necessary steps to enable data transmission between the D2D devices. The same DL/UL sequences 130a, 130b in the second set of radio resources 120 are available for exchange of D2D broadcast messages. A non-limiting example of this operation is shown in FIG. 6. In this manner the D2D handshake using the first set of radio resources 110 of the beacon frame 100 is done using the same OFDMA symbols (in parallel) to broadcast transmission and reception using the second set of radio resources 120 in the beacon frame 100.

Figure 2:
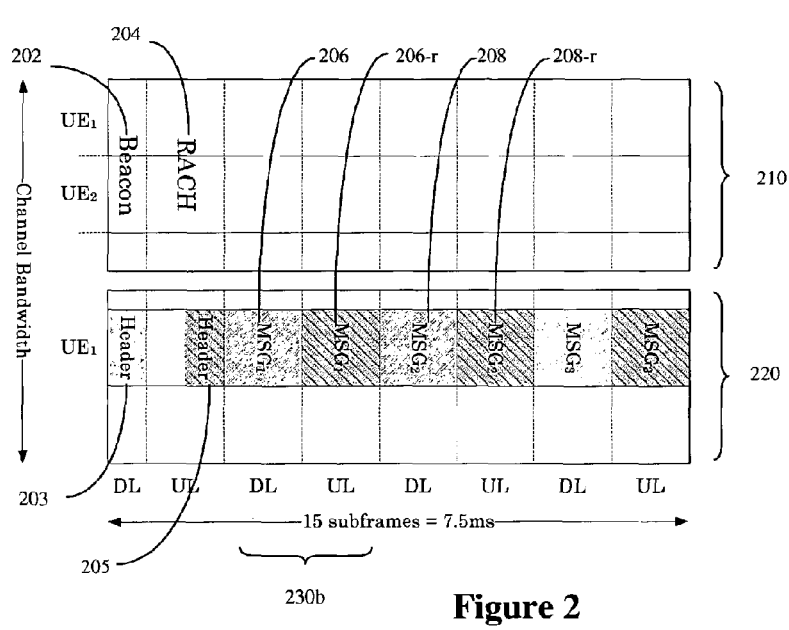
FIG. 2 is similar to the beacon frame of FIG. 1 but showing specifically broadcast message transmission by a first UE and re-transmission by a second UE that is broadcast partner to the first UE, according to an exemplary embodiment of the invention.

Broadcast messages in the same beacon frame can be re-transmitted so as to forward broadcast messages to other beacon transmitters. A beacon opportunity may be seen as simplified operation in which a first group (e.g., one half, termed as "even" for simplicity) of the D2D devices transmit their beacon and a second group (e.g., the other half, termed as "odd" for simplicity) of the D2D devices receive the first group's beacons. In order to reach active devices of the second group (other transmitter in the present case of beacon transmitters) during a beacon opportunity the message should be repeated, which is shown by example at FIG. 2. Consider two D2D devices, a first device $UE_1$ in the first group and a third device $UE_3$ (not specifically shown) in the second group so that only the first device transmits its beacon at FIG. 2. The third device may then be considered the broadcast partner to the first device. The first device broadcasts its beacon 202 and it may receive a RACH request 204 from the third device. The first device then sends a first broadcast message $MSG_1$ 206 as shown at FIG. 2, which its broadcast partner $UE_3$ re-broadcasts at 206-r within the same sequence 230b in which the first device $UE_1$ sent the original broadcast 206 of $MSG_1$. Additional broadcast messages may also be retransmitted according to this same pattern as shown for original 208 and re-transmission 208-r of a next broadcast message $MSG_2$ within the same beacon frame of FIG. 2. Stated generally, the broadcast partner repeats the broadcast message during the UL periods of the D2D beacon frame. Thus within a single beacon frame, the broadcast message sent by $UE_1$ is received by other beacon transmitters such as $UE_2$ and by the beacon receiver such as the broadcast partner $UE_3$. As shown at FIG. 2, during the first DL period in which the beacon itself is transmitted 202, the broadcast message header 203 is sent and the message content parts ($MSG_1$, $MSG_2$, etc.) are sent 206, 208 by the beaconing device $UE_1$ in the following DL parts. The header 205 and message parts ($MSG_1$, $MSG_2$, etc.) are immediately repeated 206-r, 208-r during the UL parts of the D2D beacon frame by a broadcast partner $UE_3$. Immediately means in the next sub-frame; there may be guard periods to separate transmit and reception opportunities to allow devices to re-tune their radios.

Since the handshake messages 106 and the broadcast messages 108 will in exemplary embodiments of the invention be using the same OFDMA symbols in the same beacon frame 100, according to a particular embodiment the transmitting device includes a broadcast indication (e.g., a Broadcast Message Sent bit) in its transmitted beacon 102. FIG. 3A illustrates one exemplary embodiment of such a broadcast indicating bit and its meanings: if set to 1 the bit indicates there is a broadcast message 108 in the beacon frame 100 and if set to 0 the bit indicates there is no broadcast message 108 in the beacon frame 100. Stated generally, there is a bit in the device's beacon indicating presence or not of a broadcast message in the same OFDMA symbol. One technical effect of this embodiment is that the receiving devices can learn from the device beacons which they are following anyway if there is a broadcast message present in the frame, so there is no additional message for the receiving devices to listen for or blind detection needed to discover a broadcast message transmission.

In a particular embodiment as shown at FIG. 3A there is also a plurality of bits (5 at FIG. 3A) for indicating the resources on which the broadcast message(s) is sent for the case in which the indicating bit indicates there is a broadcast message 108 in the beacon frame 100. In an alternative exemplary embodiment the primary and secondary synchronization sequences used for the beacon transmissions (defining the physical device ID) are also added to the broadcast message. Either of these two embodiments can be used to identify the transmitter of the broadcast message even when multiple broadcast messages collide.

FIG. 3B illustrates an exemplary embodiment of bit fields in a broadcast message header, which is transmitted by example in the first DL subframe 204 as shown at FIG. 2. This header is also repeated/retransmitted by the beacon partner in the following UL subframe (in the re-transmission of $MSG_1$ 206-r of FIG. 2).

There is a field "Subframes Allocated for Broadcast" 302 which indicates the amount of subframes (DL periods) that are allocated for broadcast message transmission. In the FIG. 3B example there may be one through eight of the DL subframes following the beacon transmissions which are reserved for the broadcast message transmission according to this field 302. [Note: in the particular implementation of FIG. 3B, value 0 is reserved.] There is a field for "Retransmission" 304 which is only one bit long. If the retransmission bit is set to 0 this indicates that the source device is transmitting the broadcast message for the first time; in all other instances the retransmission bit is set to a value of 1.

There is also shown at FIG. 3B an additional information element IE or field 306 which gives an indication of the next time when broadcast messages are sent. This field 306 is at FIG. 3B of length eight bits, and provides allocation information for the future beacon slots used, and further it reduces the likelihood of having multiple transmitters transmitting in the same beacon slot. FIG. 3C is a specific example of the bit values for this "Retransmission Control Bit" field 306. In an exemplary embodiment this Retransmission Control Bit field 306 is present in all transmitted broadcast frames and controls the retransmission of the broadcast message.

All of the values for the exemplary eight bits (indexed as 0, 1, . . . 7) of the Retransmission Control Bit field 306 are detailed with respect to FIG. 3C.

Bit 0 is set to 1 to indicate that all recipients of the broadcast message shall retransmit the frame. This option is typically set at the source device of the group addressed frame.

Bit 0 is set to 0 to indicate that only broadcast partners shall retransmit the group addressed frame. Typically the source of the broadcast message sets bit 0 to 1 and enables wide distribution for the broadcast message. The retransmitted messages typically have the bit 0 set to 0.

Bits 1 to 7 indicate the operation of the assigned broadcast partners. The bit that is assigned to a partner set to 1 indicates that the broadcast partner shall retransmit the frame. The bit set to 0 indicates that the broadcast frame shall not be retransmitted.

At FIG. 3C there is also shown an additional column for bits 8 and 9 for example. This portion of the Retransmission Control Bit field 306 informs those broadcast partners which are identified at bits 0 though 7 as re-transmitters how many more hops there are in the re-transmission. In the re-transmitted messages these broadcast partners send, they each decrease the value of this field by one. In this manner the field counts down to zero further re-transmissions as it propagates among multiple hops. IN an alternative implementation, there may be one or two (or more) bits to indicate number of retransmission hops remaining associated with each of the broadcast partner specific bits 0 trough 7 at FIG. 3C, which selectively extends the re-transmission in different directions by different lengths (# of retransmissions).

The originator of the broadcast message (e.g., the device which transmits its beacon in the beacon frame 100) assigns some broadcast partners to repeat the transmitted message and to announce that the transmission was successful. The originator of the broadcast message may reduce the amount of retransmissions by setting only a few broadcast partners to retransmit the message, as opposed to all neighboring devices.

The originator of the broadcast message may steer to the direction of the forwarded message by assigning some broadcast partners to forward the message. Thus, the message may be flooded only to the desired directions. Such controlling of the amount of the broadcast retransmissions reduces network overhead and reduces the stand-by power consumption. To make this point clear, FIG. 4 illustrates a block diagram of a device and its broadcast partners showing intelligent flooding of a broadcast message which is enabled by implementing the retransmission control bit field 306.

Figure 4:
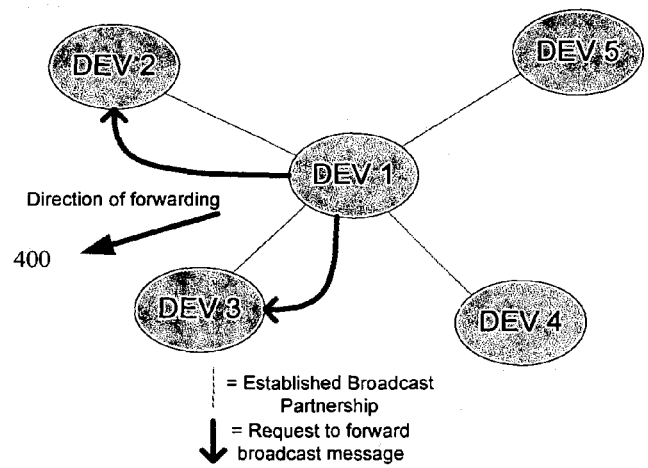
FIG. 4 is a block diagram of a device and its broadcast partners showing intelligent flooding of a broadcast message by selectively setting bits in the retransmission control bit field of the header shown at FIG. 2.

Using the retransmission control bit field 306 shown at FIG. 3C as an example for FIG. 4, assume the following: device 1 is the originator of the broadcast message; its broadcast partners are devices 2-5 which are associated with retransmission control bits 2-5 respectively; and the retransmission control bits indexed as 1 and 6-7 are unused in this frame. The header 205 transmitted by device 1 has the retransmission control bits set as follows:

bit 0 is set to value zero, meaning only broadcast partners retransmit;

bits 2-3 are each set to value one meaning devices 2-3 each retransmits;

bits 4-5 are each set to value zero meaning devices 4-5 do not retransmit.

The end result given the relative physical positions of the devices shown at FIG. 4 is a selective direction of forwarding 400 the broadcast message since only the broadcast partners along that general direction are retransmitting while other broadcast partners are not.

Figure 5:
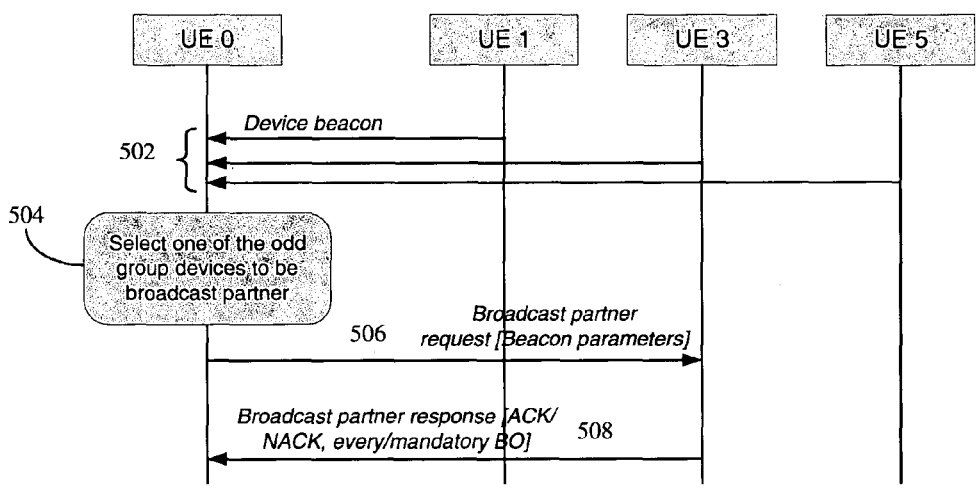
FIG. 5 is a signaling diagram for setting up broadcast partners according to an exemplary embodiment of the invention.

With reference to FIG. 5 is described an exemplary embodiment of how to set up broadcast partners via signaling. As noted above, the broadcast partners are used to re-transmit/forward the broadcast messages of beacon transmitters (the devices which originate broadcast messages 108, 206, 208 in the same beacon frame 100 in which they broadcast their own beacon 102) to the beacon receiver. In an exemplary embodiment of the invention each device that transmits broadcasts sets up a broadcast partner procedure with one to seven devices of the other broadcast group. More than seven devices may be set up for partnering in other embodiments, dependent on the number of bits allocated for the retransmission control bit field 306 at FIGS. 3B-C. In an exemplary embodiment the devices that have set up broadcast partnership will monitor each other's broadcast transmissions; will maintain statistics of the transmitted broadcast messages and depending on the control signaling they may also retransmit the received broadcast messages.

At FIG. 5 assume UE0 is the device which broadcasts its beacon and which originates the broadcast messages in the beacon frame, and UE3 is the device which UE0 selects to set up as one of its broadcast partners. UE0 learns that devices UE1, UE3 and UE5 are in its vicinity by listening for and receiving those devices' beacons 502. At block 504 UE0 selects UE3 from the odd group devices to be one of its broadcast partners. For this FIG. 5 example there are only two UE groups for beaconing which are considered: odd and even, distinguished by the beaconing frame 100 in which they transmit their beacons. UE0 is an even group device and the odd group devices broadcast their beacons in beacon frames different from those in which UE0 broadcasts its own beacon, and so UE0 knows UE1, UE3 and UE5 are in the odd group by the frame in which UE0 receives their beacons 502. There may be more than only two beaconing groups as noted above where it is explained how to extend these teachings to 250 or more devices. The beaconing opportunities for even and odd beaconing groups are shown at FIG. 7, with additional beaconing opportunities between those two groups in which additional beaconing groups can be defined.

After selecting UE3 at block 504, UE0 then transmits a Broadcast Partner request message 506 to UE3. In an exemplary embodiment this message 506 includes the following information elements (also termed beacon parameters for this message 506):

Message type: this indicates a request to setup a broadcast partnership between the devices.

Dialog token: this specifies the transaction, and is used to ensure that re-transmissions of the request 506 and possible new requests are handled correctly.

Physical Device ID of the requesting device: this is the ID of UE0 which is obtained by the physical PHY parameters according which the message 506 was sent.

Resources used for beacon transmissions of the requesting device/UE0.

Broadcast transmission interval applied by the requesting device/UE0: this indicates the basic periodicity for the broadcast messages transmission.

In response to receiving the Broadcast Partner request message 506, UE3 responds by sending to UE0 a Broadcast Partner response message 508. This message 508 includes the following information elements:

Message type: this indicates a response to set up a broadcast partnership between the devices.

Dialog token this is set to the same value as specified in the broadcast partner request message 506 to specify the transaction in progress, and is used to ensure that re-transmissions of the request 506 and possible new requests are handled correctly.

Success: this indicates the success of the request 506, and by example this field has meanings as follows: value 0=success; value 1=failure & operating in wrong broadcast group, value 2=failure & too many monitored devices, value 3=failure other than values 1 and 2 (e.g., unspecified failure).

Physical Device ID: this is the ID of the responding device UE3.

Resources used for beacon transmission by the broadcast partner UE3.

Broadcast transmission interval accepted by the broadcast partner UE3: note that in an embodiment this accepted interval can be less frequent than the interval of the request 506 in order to enable further power save options for UE3.

The selection by UE0 at block 504 of the broadcast partner device UE3 may for example be based on signal strength or time duration of mutual neighborhood relation (i.e. select a device that is close and stationary to UE0). The UE0 may also consider the locations of any other of its broadcast partners in selecting an additional or replacement partner. The location information helps the UE0 to set directivity to the flooding broadcasts or to reduce the amount of retransmissions of broadcasted frames as shown generally at FIG. 4.

FIG. 6 is an exemplary broadcast frame 600 in which a first D2D device transmits its beacon 602 but in which that beacon 602 indicates that there are no broadcast messages to be sent by the beaconing device. In this case, the resources which the first D2D device might have used for broadcast messages are available for broadcast messages originated by one or more partner devices in an exemplary embodiment of the invention. In the FIG. 6 example, there are two partner devices which each send three broadcast messages (or alternatively one broadcast message in three parts) in the beacon frame 600 in which the first D2D device transmits its beacon with the indication that it has no broadcast messages to send in this frame 600 (see FIG. 3A for the specific broadcast message IE).

Note that in cellular and other hierarchical type communication systems the terms UL and DL mean respectively UE to base station and base station to UE; the terms UL and DL have a less strict meaning in ad hoc and D2D networks which are not hierarchical and so the terms DL and UL in this description have the less strict meaning understood for ad hoc and D2D networks and are simply used to distinguish adjacent time periods in a frame from one another. Since the beaconing first D2D device has no broadcast messages to send (which by FIG. 2 were sent originally in the DL subframes), in FIG. 6 the original transmissions of the broadcast messages are all sent in UL subframes since they are sent by the partner devices.

The first D2D device transmits its beacon 602 in the first DL subframe 650 of the beacon frame/opportunity 600 and this beacon 602 indicates there are no broadcast messages from the first D2D device. The two example partner devices each transmit a D2D trigger 603a as response to the received beacon frame in the first UL subframe 651. The D2D trigger can be used to indicate that the device wishes to initiate signaling to setup D2D/ad hoc network. The first D2D device replies to the D2D trigger by transmitting a handshake/authentication message 603b beginning in the second DL subframe 652, and the handshake procedure continues in further subframes such that the partner devices transmit handshake/authentication messages 611a in the UL subframes 653, 655 and 657 and the first D2D device transmits its corresponding handshake replies 611b in the following DL subframes 654, 656 and 658. Alternatively, to avoid monitoring of potential broadcast message resources for broadcast messages of a broadcast partner, the D2D trigger can be used to indicate the transmission of a broadcast message to the broadcast partner.

Seeing the indication in the beacon 602 of the first DL subframe 650 that there is no broadcast message from the beaconing first D2D device, the partner devices transmit their own broadcast message indication 604a, 604b (shown by example at FIG. 3A) in the first UL subframe 651. This message 604a, 604b by example indicates the radio resources 640, 642 on which the original broadcast messages will be sent by the partner devices in this broadcast frame 600.

The partner devices transmit in the second UL subframe 653 the broadcast header 621a, 621b (see for example FIG. 3B) and the first part 631a, 631b of their first broadcast messages MSG1_1 and MSG 2_1. In this example the (UL) periods 651 which are used in FIG. 2 for RACH and handshake are only used to indicate 604a, 604b the intention of the partner devices to send a broadcast message since the involved devices are already partnered and the RACH exchange is not needed. The broadcast header 621a, 621b sent by the partner devices introduces the transmitted broadcast part of the frame 600 and specifies how many of the following UL periods (1-7) in this BO 600 that are used by the partner devices for their broadcast message transmission(s). In the FIG. 6 example the broadcast header 621a, 621b would indicate there are three UL periods (653, 655, 657) in which the partner devices will transmit their own broadcast messages.

The beaconing/first D2D device re-transmits in the DL subframe 654 immediately following the second UL subframe 653, and the partner devices receive there, re-transmissions of the broadcast header 621a-r, 621b-r and of the first part 631a-r, 631b-r of the first broadcast messages MSG 1_1 and MSG 2_1 sent by the partner devices. The other two pairs of broadcast messages MSG 1_2 and MSG 2_2 along with MSG 1_3 and MSG 2_3, follow similar transmission and re-transmission procedures, but the header 621a, 621b is neither transmitter again by the partner devices nor re-transmitted again by the beaconing first D2D device.

FIG. 6 applies equally to other partner devices which neither send their own beacon 602 nor transmit original broadcast messages in the frame 600; they simply perform the re-transmissions shown for the beaconing/first D2D device and also the handshake procedures. In general, each D2D device transmitting broadcast messages should have at least one broadcast partner device that repeats at the following DL period(s) the whole or part of the broadcast message that was transmitted in the UL period(s) by the originating D2D device. This operation ensures that partner devices, which in FIG. 6 are transmitting original broadcast messages during the UL periods (i.e. the partner devices which are receiving the device beacon 602 in the same beacon frame 600), can receive the broadcast message from other partners. The first DL period 654 in which devices re-transmit have those devices repeating the broadcast headers 621a-r and 621b-r.

The possibility of broadcast message transmission initiation at the UL resources provides better efficiency for beacon frame resource utilization. Note that the beaconing/first D2D device, which is a potential broadcast partner, receives the D2D triggers 603a during the first uplink period 651 when the beacon receiver/broadcast partner indicates at 604a, 604b that there is a broadcast message transmission. Thus, the beaconing D2D device does not have to wake up in a subframe following its beacon subframe 650 and the subframe containing the D2D trigger 651 only to receive broadcast indications 604a, 604b from target devices, and therefore only little additional energy is consumed.

FIG. 7 is a timeline of a superframe 700 showing exemplary beacon opportunities for broadcast message transmission. In this embodiment the D2D devices must be active (e.g., broadcasting their own beacon) at minimum each $16^{th}$ beacon opportunity for broadcast messages reception and transmission. Applying the above odd/even D2D device groupings, there is an even group beacon opportunity 702 spaced eight of the regularly spaced beacon opportunities from the odd group beacon opportunity 704, and vice versa. Assuming the even and odd D2D devices are broadcast partners to one another, the even group transmits their beacons at BO 702 according to FIG. 2 and the even group responds according to FIG. 2, or in the case the even D2D device has no broadcast message at BO 702 then the odd partner devices may respond within BO 702 as in FIG. 6. Ideally, each even D2D device sending its beacon in a BO 702, 704 sends it on a different channel than the other even D2D devices as noted above. In very crowded environments or where the BOs are not allocated with sufficient frequency for the needed D2D communications, there may be some sharing of channels. Of course, devices from more than two groups can partner with one another, meaning instead of an individual D2D device having a BO ratio of 1:1 for being a beaconing device and a partner device, that device will instead have more BOs in a given superframe 700 in which it is a partner device (beacon-receiving) than it is a beaconing device (beacon-sending).

The BOs are dedicated for D2D communications in an exemplary embodiment. The particular BO in which an individual device has to transmit its beacon may in an exemplary embodiment depend on the device ID of the individual device, which avoids having to use control signaling to assign devices to BOs. For example, devices belonging to the even group have a device ID which equals to an even number and devices belonging to the odd group have a device ID equal to odd number. In an embodiment there is an algorithm, stored in the local memory of each D2D device, which makes a random and statistically even split of the devices into the two (or more) groups. Two similar sized groups provide good performance for the message retransmission and distribution of the messages is ensured, as shown generally at FIG. 10 which illustrates an example of the minimum activity for the even and odd groups' broadcast transmission.

It may be that a device's broadcast messages are too long to fit within the confines of one BO. In that case, according to an embodiment of the invention the headers 203, 621a, 621b for the broadcast message transmission contains a "continuation" bit that indicates that the transmitting device will continue its broadcast transmissions in one of the next two following BOs. The D2D devices which are receiving those broadcast messages shall receive during the following BOs in response to seeing that bit is set. If the receiving device detected energy and activity that might be coming from broadcast transmission but is unable to properly decode the message or the continuation bit, such a receiving device is recommended to receive during the next two following BOs in order to ensure that any following broadcast messages are not missed.

Above with respect to FIG. 3A it was disclosed that the broadcast indicator sent with the beacon 203 (or sent by the partner devices separately as the broadcast indication 604a, 604b at FIG. 6) indicates which broadcast resources are selected for the broadcast message(s). To select these resources, according to an exemplary embodiment of the invention the D2D device first detects the available resources for broadcast message transmission; and then applies a selection algorithm detailed by example below to select from the available resources which one(s) will be used for broadcast transmission.

The amount of unused resources which is what the D2D device detects depends at least on the amount of devices in the beacon group and on the beacon resources used by beacon transmitters. Assume for an example that there are 50 beacon slots (of 1 MHz bandwidth) available and that there are 20 devices. Thus, there would be 30 beacon slots available for broadcast messages.

Information about the beacon resources used in the local neighborhood can be obtained for example by using an autonomous beacon measurement procedure. One example of such an autonomous procedure is that each D2D device that transmits D2D beacons shall monitor and report the D2D beacons that it has received. The information about the received beacons is transmitted in a D2D Beacon Reception Indication frame (as IEs) which contains the received D2D Beacons listed in a Beacon map element. By example, the D2D Beacon Reception Indication frame may be transmitted during a D2D BO as an IE, or it may be exchanged in a request and response scheme as unicast frames during the handshake phase of the BO. Using this measurement procedure the devices are aware of each beacon resource used in the two hop neighborhood.

The resources for broadcast message transmission may be selected by either of the following two exemplary algorithms. In a first resource selection algorithm, the device randomly selects one of the unused beacon slots. In a second resource selection algorithm, the device calculates the beacon slot for broadcast message transmission by: a) determining the unused (free) beacon slots (some value between 0 and one less than the total amount of free beacon slots); then b) index or number the unused beacon slots by setting 0 to the lowest unused beacon slot and increasing the number by one for each remaining unused beacon slot; and c) selecting the numbered unused beacon slot by using some formula based on the device ID or some other unique identifier [for example, number of unused beacon slot=(own device ID) modulo (one less than the total amount of free beacon slots)].

Figure 8:
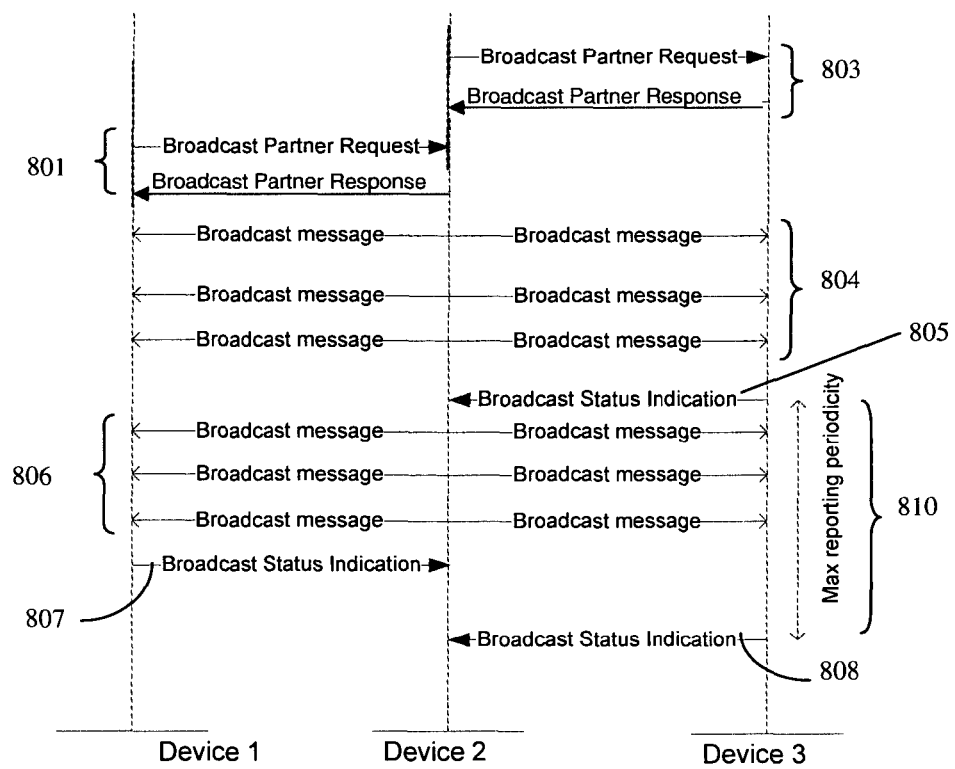
FIG. 8 is a signaling diagram showing broadcast partner set up message exchanges and broadcast status indications based on quality of received broadcast messages according to an exemplary embodiment of the invention.

The autonomous broadcast message quality measurement may be established with the beacon partner, for example in broadcast partner setup signaling as shown by example at FIG. 8. In this signaling the basic parameters for broadcast message quality measurement are signaled. During the broadcast message transmission, the D2D broadcast partners keep a record in their internal memory of the broadcast message receptions and compare the performance against the criteria provided during setup signaling for the broadcast partnership. If the criteria is met, the broadcast partner transmits a broadcast indication frame that contains the performance statistics of the broadcast message transmission. If the criteria is not met for an extended period of time, or is not met at consecutive broadcast message transmissions, this is reported after a maximum reporting periodicity for the broadcast partners, which defines the interval of broadcast indication transmissions.

Consider FIG. 8. Device 2 exchanges partnering requests 801, 803 with devices 1 and 3, and these requests 801, 803 carry the basic parameters for broadcast message quality measurement. Of interest in FIG. 8 is the parameters sent by Device 2 to devices 1 and 3, since the parameters from Device 2 need not be identical with those it received from device 1 and/or device 3. Devices 1 and 3 each receive a first set of three broadcast messages 804 from device 2, and each collects quality measurements of those received broadcast messages 804. At this point the messages' measured quality collected by device 3 has met the criteria, and so device 3 sends to device 2 a broadcast status indication 805.

Devices 1 and 3 then each receive a second set of three broadcast messages 806 from device 2, and each collects quality measurements of those received broadcast messages 806. It is only at this point that the messages' measured quality collected by device 1 has met the criteria it received at exchange 801 from device 2, and so device 1 sends to device 2 a broadcast status indication 807. After a maximum reporting periodicity 810 has elapsed, device 3 sends a broadcast status indication 808 also if the measured quality collected by device 3 has not met the criteria. The maximum reporting periodicity can be set by a standard or it can be parameter during the setup signaling (not shown in FIG. 9A). If one were to continue FIG. 8, it may occur that the maximum reporting periodicity for device 1 has elapsed and it sends a broadcast status indication.

FIG. 9A is a table showing fields added to the Broadcast Partner request message 801, 803 of FIG. 8 according to exemplary embodiments of these teachings to set up criteria for autonomous triggered measurement on the broadcast transmission. The device transmitting the Broadcast Partner request message 801, 803 sets up the parameters for the transmitter of the Broadcast Partner response message, and vice versa.

Shown at FIG. 9A are the following IEs for the broadcast partner request message 801, 803. The Broadcast Messages Timeout 902 IE controls the use of autonomous broadcast measurement. When the field value is set to 0, no broadcast message collisions are monitored nor reported. Values 1-63 indicate that the broadcast partner monitors collisions and the value specifies the number of BO after which the broadcast partner transmits a Broadcast Status Indication 805, 807, 808 to report that it has not received a broadcast message from the device. The Broadcast Messages Timeout field 902 specifies also a minimum reporting interval for consecutive broadcast status indication messages 805, 807, 808. The minimum reporting interval specifies the minimum period between the transmitted consecutive broadcast status indication messages 805, 807, 808. This minimum period avoids broadcast status indication storms, if the reporting criteria is met.

There is also a Max Amount of Failed Consecutive messages 904. The broadcast partner sends a broadcast status indication message, when broadcast message transmissions from the broadcast partner have more consecutive incorrectly received broadcast messages than the value indicated in the field for maximum amount of failed consecutive messages. The value 0 in this field 904 indicates that this criteria is not present. The broadcast partner can determine the number of failed messages from a sequence number included in the broadcast message header or from detected collisions.

There is further a maximum average of the failed messages 906. The broadcast partner maintains a record of reception status for the last transmitted 64 broadcast messages (or some other pre-determined fixed number). The broadcast partner sends a broadcast status indication message 805, 807, 808, when the amount of incorrectly received broadcast messages exceeds the number specified in the maximum average of failed messages field 906. The value 0 in this field 906 indicates that this criteria is not present.

FIG. 9B is a table showing fields of the broadcast status indication message 805, 807, 808 of FIG. 8 according to exemplary embodiments of these teachings. As noted above, this message is sent if the autonomous broadcast measurement criteria is met. The broadcast status indication message contains statistics of the broadcast message transmissions, and in an embodiment is transmitted as a unicast message to the broadcast partner device. Following are the IEs of that message 805, 807, 808:

The message type field 910 is used to detect the information type of the message The bitfield of BOs of Received Broadcast Messages 912 indicates the BOs in which the device received broadcast messages. The bit value 0 indicates the status of the previous BO and the bit value 64 indicates the status of the beacon opportunity 64 BOs ago. Each bit is set to 1 to indicate that the device has received a broadcast message at the BO, and set to 0 to indicate that no broadcast message is received.

The Bitfield of Received Broadcast Subslots Reception Success field 914 indicates the success of the Broadcast Subslots Reception. The status for the last 64 Broadcast subslots are specified. Each bit in this field 914 is set to 1 to indicate successful reception of the broadcast message subslot, and is set to 0 to indicate that subslot has not been correctly received.

The BOs Since the Previous Successful Reception field 916 indicates the amount of BOs since the previous successfully received broadcast subslot. The value 0 in this field 916 indicates that broadcast subslot is received correctly in the previous BO, and the value 255 in this field 916 indicates that the previous broadcast subslot is successfully received 255 or more BOs ago.

Message broadcasting capability can enable D2D capable devices discovery, D2D network operation and local advertisements. The messages are collected within the D2D beaconing resource which enables multiple broadcast message transmission at the same time and lowers the stand-by power consumption as compared to WLAN networks, as shown in FIG. 10. FIG. 10 is a comparison of the estimated power density (vertical axis) and minimum transmission and reception times (horizontal axis) for LAE using an embodiment of the present invention and WLAN radios to transmit broadcast messages. As seen at FIG. 10, the broadcast transmissions of the LAE are performed in a shorter time, and power density during the shorter transmission/reception time is typically higher. It is assumed that receive and transmit power consumption of WLAN and LAE radios will be reasonably similar, so stand-by power consumption of the LAE radio that participates to broadcast transmission is smaller than for the WLAN radio.

The resource reservation for broadcast messages delivery according to these teachings is scalable, and more resources may be allocated when needed. The continuation of the broadcast messages transmission is indicated in broadcast headers which enables devices to receive all broadcast messages, and after all messages are transmitted enable the devices to return to power save state.

Figure 11:
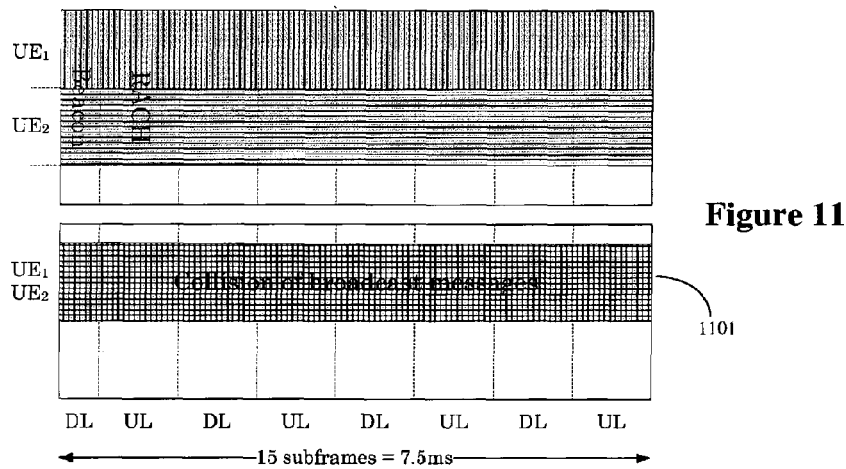
FIG. 11 is similar to FIG. 6 but showing a collision of broadcast messages when two broadcast partner devices select the same resource on which to transmit their broadcast messages.

Referring to FIG. 6, assume the two broadcast partners UE1 and UE2 which are beacon-receiving devices in that frame 600 each want to send their own broadcast messages as detailed above for FIG. 6. Each specifies in the broadcast indication 604a, 604b the resources 640, 642 on which those different broadcast messages 631a, 631b will be sent. But within the limits of the description of FIG. 6 above, there is no mechanism by which these two partner devices UE1 and UE2 coordinate those resources 640, 642 among each other. One possible result is shown at FIG. 11 in which both UE1 and UE2 are beacon transmitting devices and both choose the same resource/beacon channel on which to send their broadcast messages, leading to collision 1101. A solution to this is shown at FIG. 12, which is similar in concept to FIG. 6 and only the differences are detailed specifically.

Figure 12:
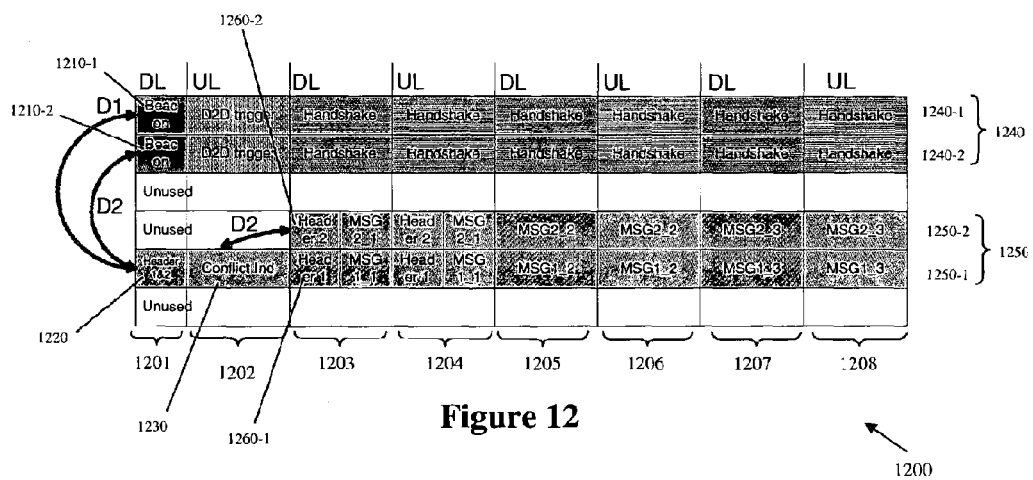
FIG. 12 is similar to FIG. 6 but showing a solution to avoid the collisions shown at FIG. 11 by beacon transmitting devices according to an exemplary embodiment of the invention.

To avoid the collisions 1101 of FIG. 11, conflicts of same-selected radio resources can be detected and resolved according to FIG. 12. The devices may detect that there is a conflict by decoding the device beacons which contain a broadcast message sent bit and the specified broadcast message resources. In another embodiment, the device beacon only includes the broadcast message sent bit and a first and second synchronization sequence is added to the broadcast message. The synchronization sequences specify the physical device ID of the devices sending the broadcast messages, the PSS and SSS noted above by example. Even in the case of a collision, a receiver will be able to detect the physical device ID and report a conflict.

The devices may resolve and avoid a detected conflict using a priority procedure. The D2D device with the higher priority is allowed to send the broadcast message on the broadcast channel (e.g., the selected beacon channel). The priority may be determined by example based on both some unique identifier such as for example the device ID, and the current time stamp which is shared among the devices. In an exemplary embodiment the time stamp may be implemented as the index or number of beacon opportunity since the number of the BO is derived from the time stamp. The device with the lower priority can select another unused resource to send its broadcast messages. The lower priority device can identify unused resource based on observing the retransmissions of broadcast partners of other devices in the following UL frame, and from the optional information of available resources in the conflict indication message.

FIG. 12 shows a beacon frame 1200 in which two beacon sending devices, D1 and D2, transmitting their beacons 1210-1, 1210-2 in the first DL period 1201 on their respective beacon channels 1240-1, 1240-2 within the first set of radio resources 1240 according to their device ID as detailed above for FIG. 1. Both these devices D1 and D2 also transmit their header 1220 in that same first DL period 1201, but they interfere with one another because both headers are sent in a same beacon channel used for broadcast message 1250-1 which is within the second set of radio resources 1250. When two devices transmit broadcast messages on the same resource, the transmissions will corrupt each other and devices which receive both transmissions will not be able to correctly receive the messages.

According to FIG. 3A above, the receiving devices can detect which devices sent the colliding headers because the device beacons themselves 1210-1, 1210-2 can identify the device which sent them and also have information elements indicating what resources or 'channels' 1250-1 they will use for sending the broadcast message (assuming the Broadcast Message Sent bit is set to value 1 to indicate that it will be transmitting a broadcast message). Assume for FIG. 12 that there is a 50 MHz band reserved for beacon transmissions and a single beacon signal uses 1 MHz. That means there are 50 beacon "channels" available. The five bits in the Broadcast Resource Selected for Broadcast Message at FIG. 3A can indicate a channel index 0 . . . 24 in this example of 25 'channels' for broadcast messages (the remaining 25 channels of the 50 total channels being in the first set of radio resources 1240 and used for the beacons and handshakes).

The receiving devices therefore know from the received beacons the specific two or more devices D1 and D2 that will send a broadcast message on the same resource 1250-1 (or if a device sends a broadcast message on a resource which is used for transmitting a beacon). The receiving devices then notify the broadcast transmitting device(s) D1 and D2 that there was a conflict. This is done by the D2D beacon receiving devices in the first UL period 1202 by the Conflict Notification message 1230 at FIG. 12. By example, the conflict notification message 1230 contains the device with the highest priority and optionally a bitmap of unused resources as shown at FIG. 13. In other embodiments, instead of a bitmap the conflict notification message 1230 may carry information about free resources as an index of a vector for a list of resources, or the message 1230 may specify one or more free resources directly.

At FIG. 13, the second field 1302 indicates the device with the highest priority, detailed below. It gives the beacon channel ID (channels 1240-1 or 1240-2 in this example, for which by example 5 bits are allocated for signaling) used by the highest priority of the conflicting devices D1 and D2, and the physical device ID of that highest priority device (by example, 4 bits allocated for signaling). The third field 1304 gives a bitmap of unused resources, in which each of the 25 available signaling bits maps to one of the channels in the second set of radio resources 1250 which are those which can potentially be used for broadcast messages.

In an exemplary embodiment, too many conflict indication messages that themselves might corrupt each other is avoided by having only the broadcast partners configured to send the Conflict Indications 1230. Thus, a device D1, D2 will only be notified about collisions from its own broadcast partners. Each of those partners can for example use different sequences in their indication message to allow decoding of each message. In another embodiment, the broadcast partner sends the conflict indication during a first slot of the first UL period 1202 following the conflicting header 1220 in the first DL period 1201, and other devices if they do not receive a conflict indication during the first slot, they may transmit the Conflict indication at the second slot of the first UL period 1202 following the conflicting header 1220 in the first DL period 1201.

While the Conflict Notification 1230 is shown at FIG. 12 as being sent on the resource(s) 1250-1 used for the broadcast message transmission and the beacon channel ID is not needed. Alternatively the devices recognizing the conflict can send it 1230 on the beacon resources 1210-1, 1210-2 used by the devices D1, D2 involved in the conflict (which are shown at FIG. 12 as D2D triggers). In yet another embodiment, the conflict indication is sent to the devices D1 and D2 on the beacon channel used by these devices or on a beacon channel reserved for conflict indications. In the FIG. 12 example, channel 1250-2 is the unused channel which the lower priority device D2 will use for its broadcast transmissions in the frame 1200.

In an exemplary embodiment, the device D1 which receives a Conflict Indication 1230 and which also has the highest priority continues to send the broadcast message on the originally specified channel 1250-1, and that device D1 also repeats the broadcast header 1260-1 in the same channel 1240-1 since the header 1220 originally sent had interference with that sent by the lower priority device D2. The device D2 which has a conflict and which does not have the highest priority selects another free resource 1250-2, such as for example from the bitmap 1304 in the conflict indicator message 1230. The lower priority device D2 re-sends its header 1260-2 on the new resource 1240-2 to which it moved its broadcast messages. The lower priority device D2 can alternatively determine which resources in the second set 1250 are free resources by finding those resources on which it detects no broadcast message re-transmission by a broadcast partner of another device.

FIG. 14 is an exemplary signaling diagram to show this conflict resolution. UE0 is a beacon receiving broadcast partner in the frame 1200, UE1 and UE5 are beacon sending devices in the frame which also have broadcast messages to send, and UE3 is a beacon sending device in the frame which does not have any broadcast messages to send. UE0 is a broadcast partner to each of UE1, UE3 and UE5. At 1402 the receiving device UE0 receives beacons from all three other devices on different beacon channels within the first set of radio resources 1240. There is no conflict among the beacons themselves and UE0 receives and decodes them all properly.

At 1404 the receiving device UE0 sees there will be a conflict between UE1 and UE5 since the broadcast indication of both indicates the same channel 1250-1 within the second set of radio resources for their broadcast messages. The headers 1220 collide and the UE0 cannot decode either of them. UE0 sends a conflict indication 1230-1 and 1230-5 to UE1 and UE5; this is the same message and it indicates that UE1 has the higher priority and it also indicates a bitmap or other indication of unused resources in the second set 1250. UE1 is the higher priority so it does nothing further apart from re-sending its header 1260-1 on the broadcast resource 1250-1 it originally selected. UE5 is the lower priority device and so it selects a new resource 1250-2 from the second set 1250 and re-sends its header 1260-2 on that new resource 1250-2.

Device priority is determined in an exemplary embodiment as shown at FIG. 15 based on the physical device ID (PHY ID) and the current time stamp. The LAE system uses a common time stamp to synchronize its operation, which is used together with the device ID to determine the priority of a device. In an exemplary embodiment, the beacon opportunities are numbered whereas the number is derived from the time stamp.

At the simplified description of FIG. 15 there are two conflicting devices, which we assume have respective device IDs of 7 and 2 (here we are using only the last digit of the device ID though other parts or the whole ID can be used). Integers 1-10 are randomly arranged at FIG. 15, and this random arrangement is commonly stored in the memory of all D2D devices (e.g., published in a D2D communication technical standard). The current time marks the starting point for priority determination, which is at value 7 of the random arrangement. The position along the random arrangement is shifted according to the device ID. Moving device ID7 to the right by seven places wraps around the random arrangement and yields a value of 5. Moving device ID2 to the right by two places along the random arrangement yields a value of 3. Device with ID7 has the higher priority than device with ID2.

The common time stamp to synchronize operation in the LAE system currently uses 20 bits (though this is not a limiting element of these teachings). In an exemplary embodiment some of these bits (for example the first nine bits) are used together with the device ID or some other unique identifier to determine the device priority. First a pseudo random sequence randomly arranges all integers from 0 to 511, similar to the listing of ten integers at FIG. 15, and the common time stamp defines the current position inside the sequence. The position of each device is determined by a shift corresponding to the physical device ID MODULO 511 (assuming for example that the physical device ID can have 504 values there will be no ambiguities). Like FIG. 15, the integer number at the position of each device determines the priority. The time stamp used for determining the priority will ideally increase by one with every beacon opportunity meaning that in each beacon opportunity there will be different priorities.

Figure 16:
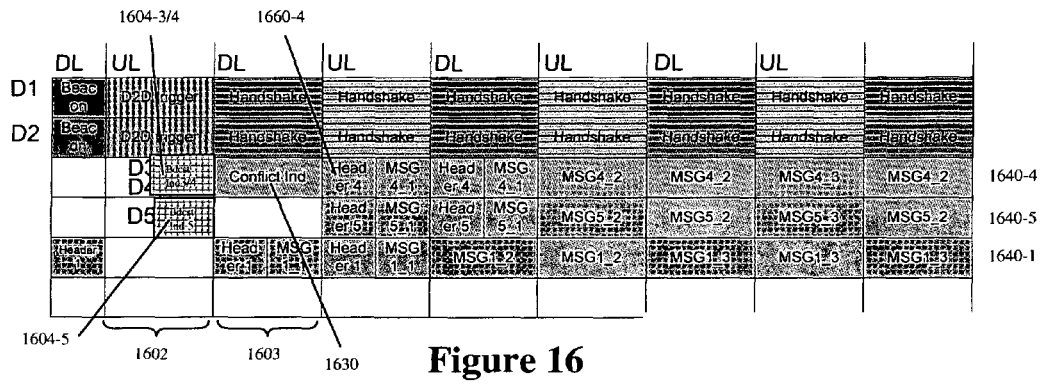
FIG. 16 is similar to FIG. 6 but showing a solution to avoid the collisions shown at FIG. 11 by beacon receiving devices according to an exemplary embodiment of the invention.

FIG. 16 modifies FIG. 6 to illustrate collision resolution for broadcast messages initiated by beacon receivers D3, D4 and D5. The broadcast partners D1 and D2 will be aware that the beacon receiver is transmitting a message which they should repeat, as detailed with respect to FIG. 6. Since the beacon receivers D3, D4 and D5 do not transmit a beacon it should be signaled with the broadcast message indications 1604-3/4 and 1604-5. The broadcast message indications 1604-3/4 and 1604-5 contain the synchronization sequences to specify the physical device ID, which is needed for priority determination per FIG. 15 and to let broadcast partners D1 and D2 in the beacon transmitter group know that the beacon receivers D3, D4 and D5 intends to transmit a broadcast message.

Figure 17:
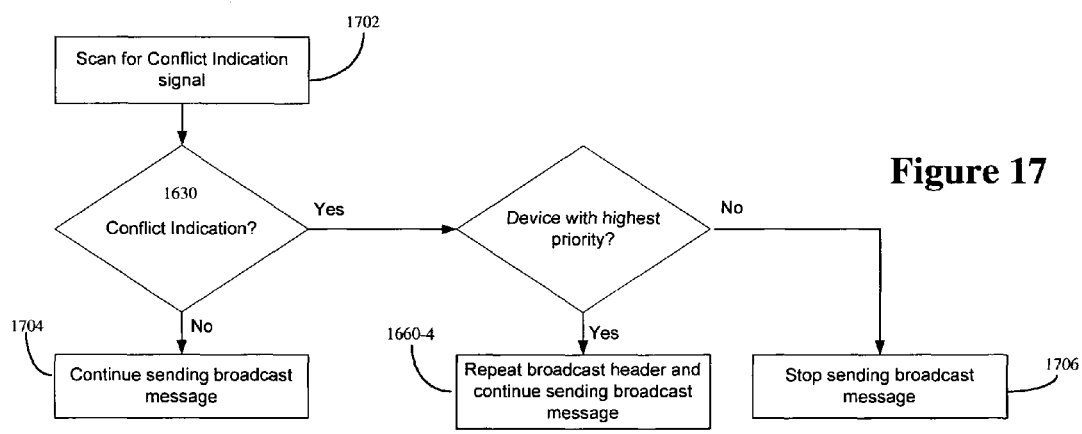
FIG. 17 is a process flow diagram illustrating procedures for avoiding broadcast message collisions by beacon receiving devices.

A beacon receiver D3, D4 and D5 shall only select one of the unused resources (not used for device beacons and for broadcast messages of beacon transmitters) for its broadcast message transmission. However, multiple beacon receivers may select the same resources and a collision may occur, and in FIG. 16 devices D3 and D4 collide in their broadcast indications 1604-3/4. In this case a similar conflict resolution procedure as shown at FIG. 12 for beacon transmitters can be used. The salient difference in this case is that the beacon receiver D3 or D4 with the lower priority will not continue to transmit its broadcast message as shown at FIG. 17. Note in FIG. 16, resource 1640-1 is being used by beacon transmitter D1 for its own broadcast messages. In the FIG. 16 example, it is the broadcast messages from beacon deceivers D3 and D4 which collide since all beacon receivers can avoid the broadcast messages from the beacon transmitter D1.

FIG. 17 is a process flow diagram illustrating procedures for avoiding broadcast message collisions by beacon receiving devices. Device D3 and D4 select the same beacon channel 1640-4 for their broadcast indication in the first UL subframe 1602 which results to a collision. Their broadcast partners scan for a conflict indication 1702 and send a Conflict Notification message 1630 in the next DL subframe 1603. The Collision Notification message 1630 also indicates the device with higher priority (see FIG. 15). In this case, D4 has the higher priority and it is allowed to continue the broadcast message transmission 1704 on its originally selected channel 1640-4 after repeating its broadcast header 1660-4. Lower priority device D3 stops the transmission 1706.

Note that if a broadcast message is transmitted by a beacon receiver D4, D5, beacon transmitters D1, D2 searching for free resources after the conflict will also avoid the resources 1640-4, 1640-5 reserved by the beacon receiver D4, D5.

Figure 18:
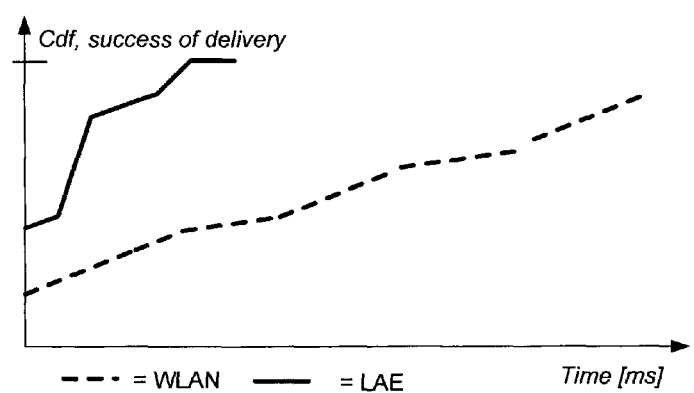
FIG. 18 is a graph similar to FIG. 10 but showing estimation of delivery success with LAE radios using exemplary embodiments of these teachings and WLAN radios.

FIG. 18 is similar to FIG. 10 and graphs an estimation of the delivery success with LAE and WLAN radios that are used for D2D network broadcast messages transmission. The collision detection and beacon broadcaster use improve the delivery success of the LAE radio. WLAN does not have acknowledged broadcast transmissions and the risk of the first transmission failure causes erasure of the broadcast messages in some topologies.

Exemplary embodiments of the invention provide a collision detection and resolution procedure thereby enabling a reliable broadcast message exchange. The technical effect of reliable broadcast transmission is that a more aggressive reduction of the number of transmission times in intelligent flooding schemes is enabled. When the number of retransmissions is reduced, the power consumption to receive unnecessary copies of the broadcast message may be avoided.

Another technical effect of the exemplary embodiments is that the collision detection and resolution procedure is defined for both beacon transmitter and beacon receiver initiated broadcast messages. A further technical effect is that the detection of successful transmission ensures that the acknowledged successful transmission will continue.

Figure 19:
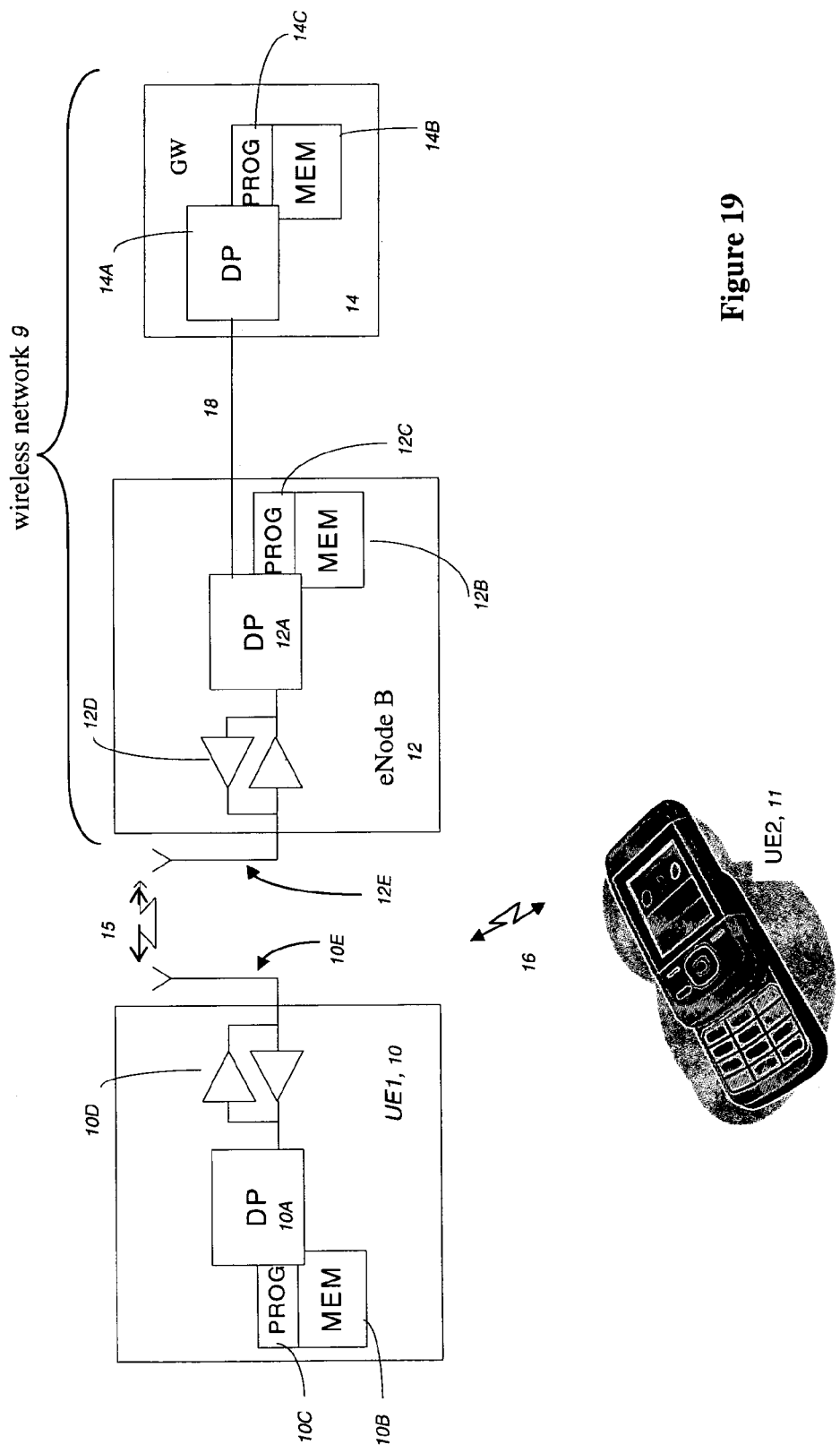
FIG. 19 shows a simplified block diagram of various electronic devices that are suitable for use in practicing the exemplary embodiments of this invention.

Reference is now made to FIG. 19 for illustrating a simplified block diagram of various electronic devices that are suitable for use in practicing the exemplary embodiments of this invention. In FIG. 19 a wireless network 9 is adapted for communication between a first UE1 10 and an access node 12 (base station), and also between a second UE2 11 and the access node 12. The network may include a gateway GW/serving mobility entity MME/radio network controller RNC 14 or other radio controller function (not shown) known by various terms in different wireless communication systems. In an embodiment the network allocates the BOs for D2D communication and may be used by the UE's to maintain synchronous operation with one another and with the allocated BOs.

The first UE1 10 is detailed but it is understood that the second UE2 11 has similar functionality and in an embodiment also similar structure. The first UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 15 with the BS 12. The UE 10 may have simultaneous communication over the D2D link 16 with the other UE 11, and the BS 12. The simultaneous communication can take place on separate resources, e.g. different frequency blocks or using the same resources utilizing further transceivers and/or antennas. Each of the links can have different or even independent maximum transmit power. The second UE 11 as well as additional UEs (not shown) are similarly configured as is shown at FIG. 19 for the first UE 10.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The BS 12 also includes a DP 12A, a MEM 12B, that stores a PROG 12C, and a suitable RF transceiver 12D coupled to one or more antennas 12E. The BS 12 may be coupled via a data path 18 (wired or wireless) to the Internet, a mobile switching center, or other broader network, which may be via a serving or other GW/MME/RNC 14. If present, the GW/MME/RNC also includes a DP 14A, a MEM 14B that stores a PROG 14C, and a suitable modem and/or transceiver (not shown) for communication with the BS 12 over the data link 18.

At least one of the PROGs 10C and 12C is assumed to include program instructions that, when executed by the associated DP, enable the electronic device to operate in accordance with the exemplary embodiments of this invention, as detailed above. Inherent in the DPs 10A and 12A is a clock to enable synchronism among the various apparatus for transmissions and receptions within the appropriate time intervals, BOs, subframes, periods and/or slots as the case may be.

The PROGs 10C and 12C may be embodied in software, firmware and/or hardware, as is appropriate. In general, the exemplary embodiments of this invention may be implemented by computer software stored in the MEM 12B and executable by the DP 12A of the BS 12 and similar for the other MEM 10B and DP 10A of the UE 10 (and the other UEs 11 detailed above), or by hardware, or by a combination of software and/or firmware and hardware in any or all of the devices shown.

In general, the various embodiments of the UE 10, 11 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Figure 20:
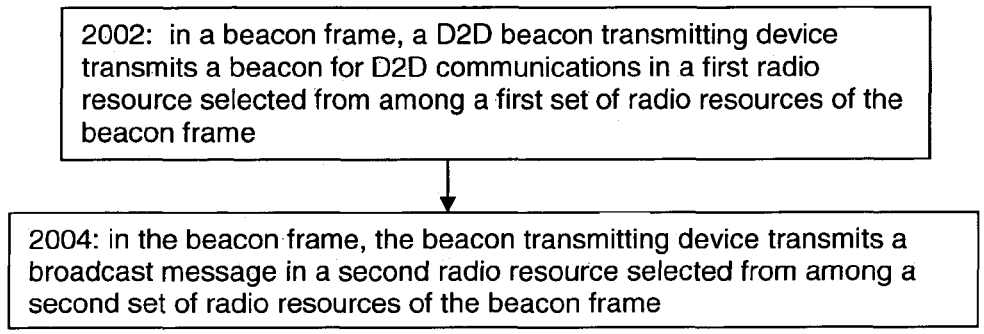
FIG. 20 is a logic flow diagram that illustrates the operation of a method, and actions taken by a D2D device or apparatus, and a result of execution of computer program instructions embodied on a computer readable memory, in accordance with exemplary embodiments of this invention.

Exemplary process steps are shown at FIG. 20. At block 2002 in a beacon frame, a D2D beacon transmitting device transmits a beacon for D2D communications in a first radio resource selected from among a first set of radio resources of the beacon frame. At block 2004 and still in the beacon frame the beacon transmitting device transmits a broadcast message in a second radio resource selected from among a second set of radio resources of the beacon frame.

Following are various specific exemplary embodiments of the elements at FIG. 20, which may be individually modifying FIG. 20 or in any combination.

The device beacon comprises an indication that the broadcast message is to be transmitted in the beacon frame.

The device beacon comprises an indication specifying the second radio resource.

There is the further element of transmitting a broadcast message header in the second radio resource during an initial subframe of the beacon frame. In this case the transmitting of the device beacon is during the initial subframe of the beacon frame, and the broadcast message header further comprises an indication of how many subframes of the beacon frame are allocated for transmitting the broadcast message.

The broadcast message header further comprises a retransmission control field that selectively indicates which of a plurality of broadcast partner devices are to re-transmit the broadcast message.

There is the further element of receiving from each of the broadcast partner devices that are selectively indicated by the retransmission control field a re-transmission of the broadcast message during a subframe of the second radio resource that immediately follows a subframe during which the broadcast message was transmitted.

There is the further element of: in response to transmitting the broadcast message header, receiving a conflict indication in a subframe of the second radio resource following a subframe in which the broadcast message header was transmitted; and in response to receiving the conflict indication re-transmitting the broadcast message header in a subframe following the subframe in which the conflict indication was received.

The conflict indication comprises an indication that the beacon transmitting device performing the FIG. 20 process is not a highest priority device of all devices indicated in the conflict indication. In this case the re-transmitting of the broadcast message header is in a third radio resource within the second set of radio resources which has been determined to be free.

The third radio resource is determined to be free from information included within the conflict indication.

The priority is determined by a unique identity and a message timestamp.

There is the additional element of using OFDM symbols in the first radio resource in parallel with same OFDM symbols used for the broadcast message for an exchange with a beacon receiving device. Examples of such an exchange include authenticating, service discovery, associating, resource negotiation and session initiation.

The said beacon frame is a first beacon frame, and there are further elements of: during a second beacon frame periodically spaced from the first beacon frame:
  receiving from a broadcast partner's broadcast message in a radio resource of the second set of radio resources of the second beacon frame; and
  re-transmitting in the radio resource of the second set of radio resources the broadcast partner's broadcast message during a subframe of the second beacon frame following a subframe in which was received the broadcast partner's broadcast message.

For the aspects of this invention detailed herein by the exemplary embodiments, it should be noted that the various logical step descriptions above and in FIGS. 17 and 20 as well as in the signaling and timing diagrams of FIGS. 2, 5-6, 8, 12, 14 and 16 may represent program steps, or interconnected logic circuits of an integrated circuit, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs which automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method, comprising:
  transmitting a beacon message for device to device communications in a cellular network in a first radio resource selected from a first set of radio resources of a beacon frame, wherein the device to device communications are direct communications between user devices, and wherein the beacon message is not a unicast message; and
  transmitting a broadcast message in a second radio resource selected from a second set of radio resources of said beacon frame,
  wherein the beacon message is transmitted at least partly in parallel in a frequency domain with, and separately from, the broadcast message within said beacon frame,
  wherein flexible orthogonal frequency-division multiple access (OFDMA) resources are utilized at least in part to the transmitting of the beacon message in the first radio resource using OFDMA symbols, and at least in part to the parallel transmitting of the broadcast message, and
  wherein the beacon message comprises an indication specifying the second radio resource.

2. The method according to claim 1, wherein the beacon message comprises an indication that the broadcast message is to be transmitted in the beacon frame.

3. The method according to claim 1, further comprising:
  transmitting a broadcast message header in the second radio resource during an initial subframe of the beacon frame;
  and wherein the broadcast message header further comprises an indication of how many subframes of the beacon frame are allocated for transmitting the broadcast message.

4. The method according to claim 3, wherein the broadcast message header further comprises a retransmission control field that selectively indicates which of a plurality of broadcast partner devices are to re-transmit the broadcast message.

5. The method according to claim 4, further comprising:
receiving from each of the broadcast partner devices that are selectively indicated by the retransmission control field a re-transmission of the broadcast message during a subframe of the second radio resource that follows a subframe during which the broadcast message was transmitted.

6. The method according to claim 3, further comprising:
in response to transmitting the broadcast message header, receiving from another device a conflict indication in the second radio resource; and
in response to receiving the conflict indication, re-transmitting the broadcast message header.

7. The method according to claim 6, wherein the conflict indication comprises an indication that the device executing the method is not a highest priority device of a plurality of devices indicated in the conflict indication,
and wherein the re-transmitting of the broadcast message header is in a third radio resource within the second set of radio resources which has been determined to be free.

8. The method according to claim 7, wherein the third radio resource is determined to be free from information included within the conflict indication.

9. The method according to claim 7, wherein the priority is determined by a unique identifier and one of a message timestamp, a time stamp derived from shared timing, and a shared numbering of beacon frames or opportunities.

10. The method according to claim 1, in which the beacon frame is a first beacon frame, the method further comprising, during a second beacon frame periodically spaced from the first beacon frame:
receiving a broadcast partner's broadcast message in a radio resource of the second set of radio resources of the second beacon frame; and
re-transmitting in the radio resource of the second set of radio resources the broadcast partner's broadcast message during a subframe of the second beacon frame following a subframe in which the broadcast partner's broadcast message was received.

11. The method according to claim 1, further comprising:
using OFDMA symbols in the first radio resource in parallel with same OFDMA symbols used for the broadcast message for an exchange with a beacon receiving device, the exchange including at least one of authenticating, service discovery, associating, resource negotiation and session initiation.

12. An apparatus, comprising:
at least one processor; and
at least one memory storing a computer readable program of instructions;
wherein the at least one memory and the program of instructions is configured with the at least one processor to cause the apparatus to perform at least:
transmitting a beacon message for device to device communications in a cellular network in a first radio resource selected from among a first set of radio resources of a beacon frame, wherein the device to device communications are direct communications between user devices, and wherein the beacon message is not a unicast message; and
transmitting a broadcast message in a second radio resource selected from among a second set of radio resources of said beacon frame,
wherein the beacon message is transmitted at least partly in parallel in a frequency domain with, and separately from, the broadcast message within said beacon frame,
wherein flexible orthogonal frequency-division multiple access (OFDMA) resources are utilized at least in part in the transmitting of the beacon message in the first radio resource using OFDMA symbols, and at least in part to the parallel transmitting of the broadcast message, and
wherein the beacon message comprises an indication specifying the second radio resource.

13. The apparatus according to claim 12, wherein the beacon message comprises an indication that the broadcast message is to be transmitted in the beacon frame.

14. The apparatus according to claim 12, wherein the beacon frame is a first beacon frame, and wherein the at least one memory and the program of instructions is configured with the at least one processor to cause the apparatus to further perform, during a second beacon frame periodically spaced from the first beacon frame:
receiving a broadcast partner's broadcast message in a radio resource of the second set of radio resources of the second beacon frame; and
re-transmitting in the radio resource of the second set of radio resources the broadcast partner's broadcast message during a subframe of the second beacon frame following a subframe in which the broadcast partner's broadcast message was received.

15. The apparatus according to claim 12, wherein the at least one memory and the program of instructions is configured with the at least one processor to cause the apparatus to further perform:
using OFDMA symbols in the first radio resource in parallel with same OFDMA symbols used for the broadcast message for an exchange with a beacon receiving device, the exchange including at least one of authenticating, service discovery, associating, resource negotiation and session initiation.

16. A memory storing a computer readable program of instructions which, when executed by at least one processor result in actions comprising:
transmitting a beacon message for device to device communications in a cellular network in a first radio resource selected from among a first set of radio resources of a beacon frame, wherein the device to device communications are direct communications between user devices, and wherein the beacon message is not a unicast message; and
transmitting a broadcast message in a second radio resource selected from among a second set of radio resources of said beacon frame,
wherein the beacon message is transmitted at least partly in parallel in a frequency domain with, and separately from, the broadcast message within said beacon frame,
wherein flexible orthogonal frequency-division multiple access (OFDMA) resources are utilized at least in part to the transmitting of the beacon message in the first radio resource using OFDMA symbols, and at least in part to the parallel transmitting of the broadcast message, and
wherein the beacon message comprises an indication specifying the second radio resource.

17. The memory according to claim 16, wherein the beacon message comprises an indication that the broadcast message is to be transmitted in the beacon frame.

* * * * *